Patented Sept. 14, 1948

2,449,064

UNITED STATES PATENT OFFICE 2,449,064

METHOD OF FERMENTING WHEY

Emmet R. Engel, Berwyn, Ill.

No Drawing. Application January 10, 1945,
Serial No. 572,243

10 Claims. (Cl. 99—35)

This invention relates to whey products and has more particular reference to liquid and solid whey products or derivatives and a method of making the same.

For so much of the subject matter disclosed herein which is also disclosed in my earlier filed United States Letters Patent application for "Whey products and method of making same," Serial No. 464,517, filed November 4, 1942, which has now become abandoned I claim the priority of my said earlier filed application.

An object of the invention is the provision and production of novel whey products made of whey, sugar, and yeast.

The invention has as a further object the provision and production of a palatable liquid derived from whey and having a controlled alcoholic content.

Yet another object of the invention is the provision and production of a solid whey product suitable as a culture or precipitating agent for expediting the novel method of making the unique whey products, clarifying the liquid, and improving the flavor and age characteristics of the novel beverage.

Other objects of the invention will appear from the following description which by way of illustration discloses a preferred embodiment of the invention.

Briefly stated, the objects of the invention are attained by mixing whey, cane sugar, and yeast together in suitable proportions, maintaining the mixture at controlled temperatures for definite periods of time, separating the liquid from the solids from time to time, and clarifying the liquid. The solids referred to hereinafter as residuum are useful, for example, as a culture or precipitating agent in the novel method. The liquid is useful as an alcoholic beverage which is light green in color, has a pleasant taste and bouquet and a mild smoothness. It contains no fussel oil, tannic acid, or other harmful ingredient.

By my novel method I have made such a beverage with as little as 10 per cent by volume and as much as 69 per cent by volume of alcohol and traces of fixed and volatile acids, such as lactic acid and acetic acid, respectively. In terms of starting ingredients the novel whey product consists of the following percentages by weight of the indicated ingredients: from 69.31 per cent to 90.05 per cent of whey, from 29.46 per cent to 9.01 per cent of cane sugar, and from 1.23 per cent to 9.94 per cent of yeast culture. While in the foregoing formula I have specified cane sugar in the indicated range, I have found that other sugar may be employed, and in fact, I have made the novel product without adding any sugar. Where no sugar is added, a culture is recovered from about the thirty-second to about the forty-fifth day from a ferment of whey, sugar, and yeast, and is added to the whey. The range given is not therefore to be considered as limitative, but simply as that preferred for economical and other reasons.

The yeast culture just referred to is made of whey, cane sugar, and "Dyson's miracle" yeast or other suitable bakers' yeast in the following percentages by weight: from 5.63 per cent to 19.07 per cent of sugar, from 0.56 per cent to 1.43 per cent of yeast, and from 93.81 per cent to 79.50 per cent of whey. For example, for each one thousand (1000) pounds of whey and two hundred twenty-five (225) pounds of sugar employed to make the novel whey product, one pound of cane sugar, one-tenth pound of the yeast, and one gallon of sweet, freshly separated whey are mixed together and the mixture is maintained at about 85° F. for about twenty-four hours to form the culture. That temperature may be varied between about 70° F. and about 90° F. with consequent variations in time, whereby the culture may be made in from about fifteen to about thirty-six hours without departing from the spirit of the invention. The stated example, however, includes the time and temperature values as well as the proportions which are preferred by me.

The invention, of course, is not limited to any particular apparatus, but I have found it convenient to employ a ferment tank with a volumetric capacity about one-third greater than the total volume of the ingredients employed, whereby to accommodate the foam produced during the practice of the novel method. That tank is constructed of wood, earthenware, or other non-corrosive material, and preferably has an air-tight cover provided with a two-thirds removable top. An air vent leads from the center of the cover into water. A low speed agitator is arranged in the tank and a source of air under pressure communicates with the interior of the tank at the bottom thereof for cooperating with the agitator and air vent to remove gas and odors from the tank. Associated with the tank is a suitable hopper by means of which cane sugar is supplied to the interior of the tank.

Illustrative of the novel method, I employ sweet whey which has been freshly separated to remove the fat residuum and drawn off immediately after separation from the curds to avoid marked acidity. Preferably, some of the sugar, say about 10 per cent by weight thereof, is added to the whey to inhibit undue acidification. Thereafter the sweetened whey is poured or otherwise delivered into the ferment tank described above at about 85° F. To that whey, the culture, prepared as already described, is added in the tank and the whey and culture are mixed together. The balance of the sugar or, in the event none of the sugar has previously been added to the whey, all of the sugar is placed in the hopper and delivered thereby into the tank over a period of about seventy-two (72) hours, which is the rate at which the yeast culture will well consume the sugar without early putrefaction.

The ingredients are thus mixed in the proportions already stated hereinbefore. The mixture is permitted to stand for about three and one-half months. During that period the temperature is controlled and, from time to time, the solid and liquid whey products are separated from one another. During the first three days, the temperature of the mixture in the tank is maintained at about 64° F. It will be understood that some variation in that and the other temperatures is possible, whereby to accelerate or retard the process and those, in any case, first mentioned are the preferred values. Permissible variations in temperature will be approximated by ranges of temperatures, it being understood that, in general, the action is accelerated by an increase in temperature, and retarded by a decrease in temperature. Accordingly, the temperature during the first three days may be maintained at from about 58° F. to about 72° F.

Thereafter for about six days, the temperature of the mixture in the tank is maintained at about 60° F., or from about 50° F. to about 66° F. During that time a scummy substance collects at the surface and is skimmed off or otherwise removed. The temperature is thereafter reduced to from about 45° F. to about 50° F.

On or about the tenth day following the addition of the sugar a black crust will be observed. It is removed and upon removal an oil-like film will be revealed on the contents of the tank. This film is present in the proportion of about one pint of film per one thousand pounds of the contents of the tank. The film is skimmed off or otherwise removed. The remaining liquid is siphoned from the tank, leaving a gelatinous or paste-like residuum which is collected and stored at about 50° F.

The liquid thus siphoned from the tank is placed in a suitable container and preferably kept in a dark room, the temperature of which is maintained at from about 45° F. to about 50° F. The next ten days to forty-four days, i. e., from twenty to fifty-four days after delivery of the sugar into the ferment tank, may be termed the flavor period. At about the fiftieth day after the sugar is added to the whey-culture mixture, a gelatinous or paste-like residuum is separated from the liquid and stored with the previously collected residuum and under the same conditions as already described above. The resulting liquid is dark brown and cloudy, palatable and nutritious, but is not stable. It is like sherry or sauterne wine.

At this stage of the novel method the flavor is set or fixed so as to be retained in the final product. I fix the flavor in the whey product by controlling the quantity of cane sugar and the time and temperature during and under which the mixture of whey, sugar, and yeast is treated. The dark brown liquid is, for example, subjected to a low temperature in the order of —10° F. and that temperature is maintained for at least four days. If a lower temperature is employed, somewhat less time is required to fix the flavor. To illustrate fixing, for example, one desirable flavor, I employ three pounds of cane sugar for each ten pounds of whey and deliver the sugar into the mixture of whey and culture over a period of about two and one-half days at 70° F. On about the twenty-fifth day thereafter, the desired flavor will be at its optimum value, whereupon the mixture is subjected to the mentioned low temperature for about four days to fix or set that flavor.

Such fixing of the desired flavor is also accomplished by frost extraction of water in the form of ice when the desired flavor is at its optimum value. As is well-known in the art, frost extraction is accomplished at sufficiently low temperatures to solidify the water in the material and by separating the ice therefrom to any desired extent. Besides fixing the desired flavor, the frost extraction of water results in a greater alcoholic content with respect to the other ingredients. Frost extraction may be employed at this stage or subsequently to remove water from the liquid whereby to increase the proportion of alcohol with reference to the other ingredients in the novel product. In this manner the alcoholic content of the beverage can be varied and the beverage provided with the desired proof spirit percentage of alcohol without destroying the vitamin content.

Following the flavor period there is an indefinite lag or aging period during which no apparent action is taking place. The liquid becomes increasingly bitter and finally marked bubbling or ebullition occurs. The liquid is in a glossy turbulent state characterized by a soap-like slipperiness with milky bubbles resembling soap bubbles. Hence I call this stage "saponification." The temperature of the liquid rises. For example, if the room containing the vat or vessel of liquid is at 50° F., the temperature of the liquid will rise to about 70° F. and the action will occur at temperatures as low as —30° F. The action continues for about eight days during four of which it is at pitch and is completed at about two and one-half months from the time the sugar is added to the whey culture mixture. Suddenly the action subsides.

Examination reveals a wax-like surface over a liquid having a gelatinous mass immersed therein. The wax-like covering is removed and the liquid is separated as before from the gelatinous mass which is stored with the residuum previously collected as already explained. The liquid is clear and dark green in color, palatable and is suitable for flavoring ice cream and produces therein an agreeable smoothness of texture. At this stage the liquid is very stable and will retain the foregoing properties for a period of up to six weeks and thereafter becomes unstable, and flocculates.

For a more desirable and stable product, however, the dark green liquid is placed in a suitable container at from about 45° F. to about 50° F. and is maintained at that temperature for about thirty additional days. During about the first eight days of this additional period, visible action occurs: node-, spire-, and prism-shaped particles and particles of other shapes appear to work upwardly from the bottom, and there appears a yellow ferment meeting the description or riboflavin carrier. This action is so persistent that it is not interrupted by temperatures as low as —30° F. At the end of the eight-day period a white glue-like substance settles to the bottom of the container and the liquid is separated therefrom by a siphoning action.

During about the next eight-days a peculiar, if not unique, visible action occurs. In this action, what appears to be a continuous thread spins upwardly from the bottom symmetrically, tier upon tier, with an unbroken line and with a single counter-clockwise rotation. The greater the proof spirits of alcohol in the liquid, the more pronounced or remarkable is the action. For example, in 25 proof liquid the thread appears to rise about one-third the distance from the bottom to the top, and in 40 proof liquid the thread appears to rise about one-half the distance from the bottom to the top.

The final stage which continues for about eight days follows the foregoing action. This final stage is characterized by marked effervescence with innumerable small bubbles rising from the bottom straight to the top of the liquid and there suddenly vanishing. At the end of this action I obtain the finished beverage without residuum.

I have observed that the residua collected and stored at the various stages of the method if maintained at about 50° F. portray many of the characteristics as to flavor and activity as the liquid and among other uses they may be employed to shorten the time required for the practice of the method. The removal of the solids, including the residuum at the various stages of the novel method, clarifies the beverage and their formation may be facilitated by suddenly changing the temperature of the mixture at the desired stage or stages. In any such procedure the mixture is cooled to any temperature within the range of from about —10° F. to about —30° F. and then quickly heated to any temperature within the range of from 80° F. to 95° F. thereupon the mixture is permitted to settle at about 50° F. before the liquid is siphoned off or otherwise removed. The greater the range of temperatures and the more rapid the changes in temperature, the more effective is the removal of solids. In this manner the milk sugar is caused to collect in the residuum in bean-like shapes before the thirtieth day and is removable with the residuum (I do not, however, in this method remove the milk sugar), undesirable coloring components may be removed, and the components rendering the mixture bitter just prior to the "saponification" stage may also be removed quickly. The resulting residuum is superior for use in making a precipitating agent which, as will hereinafter be described, expedites the making of the beverage.

By using the residuum as a precipitating agent I have found that time may be saved in the practice of the novel method and the effect of aging may be imparted to the beverage. For example, according to my discovery about two parts by volume of the residuum are added to about one part by volume of the dark green liquid resulting about two and one-half months after the sugar is added to the initial whey-culture mixture and thoroughly mixed therewith. This mixture is maintained at a temperature of about 50° F. for from four to six days. The liquid thereupon becomes light green and I proceed from that stage as described in connection with the last three stages of the method for about thirty additional days to convert this light green liquid into the finished beverage, thus saving time. I have also found that when the residuum is so employed, its age characteristics are imparted to the beverage. The residuum may also be employed to improve the flavor and age characteristics and clarity of any of the finished beverage which due to errors in the novel method has in those respects been impaired.

This novel whey product made of whey, sugar and yeast provides a palatable, harmless, alcoholic beverage with a variable and controllable alcoholic content. I have found it useful not only as a beverage, but also as a flavor for ice cream to improve its texture. The novel whey product in solid form serves among other purposes the purpose of expediting the novel method by which the whey product is made.

While a specific embodiment of the invention has been described, it will be understood that the invention is not limited to the precise details hereinabove set forth by way of illustration, but instead what is claimed and desired to be secured by United States Letters Patent is:

1. A method of making a whey product which consists in preparing a yeast culture of whey, sugar and yeast; mixing whey, sugar and the culture together; maintaining the mixture at 58–72° F. for about three days; maintaining the mixture at 50–66° F. for about six days and decanting the liquid; maintaining at 45–50° F. for ten to forty-four days, depending upon the flavor desired, and decanting the liquid; maintaining at a freezing temperature long enough to concentrate the liquid to a desired proof and to fix the flavor selected in the previous step; subjecting to an initial stabilization period at about 50° F. until marked ebullition occurs and subsides accompanied by a rise in temperature, followed by decanting the liquid; and subjecting to a final stabilization period at 45–50° F. for a period, the end of which is characterized by marked effervescence.

2. The process of producing a fermented alcoholic whey product comprising reacting whey, sugar and yeast at a temperature varying between about 70° and about 90° F. to produce a yeast culture, introducing said culture into a mass of whey and sugar, maintaining the mixture at a temperature varying between about 58° and about 72° F. for a period of about three days, maintaining the so-treated mixture at a temperature varying between about 50° and about 60° F. for about six days, thereafter holding the resulting liquor at a temperature varying between about 45° and about 50° F. for a period of time varying between about ten days and about forty-four days, separating from the so-treated liquor a residuum consisting principally of fermentation solids, said liquor being at this stage of the process dark brown in color and unstable, concentrating the liquor by freezing water out of the liquor, ageing the liquor until ebullition of the liquor ceases and the liquor assumes a dark green color, and subjecting the so-treated liquor to a final ageing step.

3. The process of producing a fermented alcoholic whey product comprising reacting whey, sugar and yeast at a temperature varying between about 70° and about 90° F. to produce a yeast culture, introducing said culture into a mass of whey and sugar, maintaining the mixture at a temperature varying between about 58° and about 72° F. for a period of about three days, maintaining the so-treated mixture at a temperature varying between about 50° and about 60° F. for about six days, thereafter holding the resulting liquor at a temperature varying between about 45° and about 50° F. for a period of time varying between about ten days and about forty-four days, periodically separating from the whey and sugar product undergoing fermentation a residuum consisting principally of fermentation solids, ageing the resulting liquor until ebullition of the liquor ceases and the liquor assumes a dark green color, introducing into the liquor a portion of the residuum fermentation solids, and subjecting the so-treated liquor to a final ageing step.

4. The process of producing a fermented alcoholic whey product comprising reacting whey, sugar and yeast at a temperature varying between about 70° and about 90° F. to produce a yeast culture, introducing said culture into a mass of whey and sugar, maintaining the mixture at a temperature varying between about 58° and about 72° F. for a period of about three days, maintaining the so-treated mixture at temperature varying between about 50° and about 60° F. for about six days, thereafter holding the resulting liquor at a temperature varying between about 45° and about 50° for a period of time varying between about ten days and about forty-four days, periodically separating from the whey and sugar product undergoing fermentation a residuum consisting principally of fermentation solids, ageing the resulting liquor until ebullition of the liquor ceases and the liquor assumes a dark green color, storing and ageing the collected fermentation solids and utilizing said aged fermentation solids to age and flavor a whey and sugar liquor fermented as herein set forth.

5. The process of producing a fermented alcoholic whey product comprising reacting whey, sugar and yeast at a temperature varying between about 70° and about 90° F. to produce a yeast culture, introducing said culture into a mass of whey and sugar, maintaining the mixture at a temperature varying between about 58° and about 72° F. for a period of about three days, maintaining the so-treated mixture at a temperature varying between about 50° and about 60° F. for about six days, thereafter holding the resulting liquor at a temperature varying between about 45° and about 50° F. for a period of time varying between about ten days and about forty-four days, periodically separating from the whey and sugar product undergoing fermentation a residuum consisting principally of fermentation solids, ageing the resulting liquor until ebullition of the liquor ceases and the liquor assumes a dark green color, storing and ageing the collected fermentation solids and treating a whey and sugar liquor fermented as set forth with said aged fermentation solids to age and flavor said liquor, the aged fermentation solids being added in the ratio of two parts by volume of said solids to one part by volume of said fermented liquor.

6. The process of producing a fermented alcoholic whey product comprising reacting whey, sugar and yeast at a temperature varying between 70° and 90° F. to produce a yeast culture, introducing said culture into a mass of whey and sugar, fermenting the resulting liquor until a green color is produced while separating from the fermented liquor a residuum consisting principally of fermentation solids, and utilizing said fermentation solids to age and flavor a whey and sugar liquor fermented as herein set forth.

7. The process of producing a fermented alcoholic whey product comprising reacting whey, sugar and yeast at a temperature varying between 70° and 90° F. to produce a yeast culture, introducing said culture into a mass of whey and sugar, fermenting the resulting liquor until a green color is produced while separating from the fermented liquor a residuum consisting principally of fermentation solids, ageing said separated fermentation solids and utilizing said aged fermentation solids to age and flavor a whey and sugar liquor fermented as herein set forth.

8. The process of producing a fermented alcoholic whey product comprising reacting whey, sugar and yeast at a temperature varying between 70° and 90° F. to produce a yeast culture, introducing said culture into a mass of whey and sugar, fermenting the resulting liquor until a green color is produced while separating from the fermented liquor a residuum consisting principally of fermentation solids, ageing said separated fermentation solids and utilizing said aged fermentation solids to age and flavor a whey and sugar liquor fermented as herein set forth, said aged fermentation solids being added in the ratio of two parts by volume of said solids to one part by volume of said fermented liquor.

9. The method of preparing a fermented alcoholic whey product comprising preparing a yeast culture by heat reacting for a time period of at least 15 hours a mixture of whey, sugar and yeast, mixing the resulting yeast culture with a mass of whey and sugar, fermenting the resulting mixture until the liquor becomes green in color while separating from the liquor a residuum consisting principally of fermentation solids, and utilizing said fermentation solids to age and flavor a whey and sugar liquor fermented as herein set forth.

10. The method of producing a fermented alcoholic whey product comprising preparing a yeast culture by heat reacting a mixture of whey, sugar and yeast to produce a yeast culture, mixing the latter with a mixture of whey and sugar, fermenting the resulting mixture for a period of at least 54 days and between the 20th and 54th day of said fermentation concentrating the liquor by freezing water therefrom, said concentration simultaneously fixing the flavor of the liquor, said liquor being concentrated for a period of about four days.

EMMET R. ENGEL.

REFERENCES CITED

The following references are of record in the file of this patent:

UNITED STATES PATENTS

| Number | Name | Date |
|---|---|---|
| 117,889 | Jagielski | Aug. 8, 1871 |
| 495,381 | Storch | Apr. 11, 1893 |
| 552,681 | Bernstein | Jan. 7, 1896 |
| 560,834 | Bernstein | May 26, 1896 |
| 561,291 | Storch | June 2, 1896 |
| 1,191,440 | Laessig | July 18, 1916 |

FOREIGN PATENTS

| Number | Country | Date |
|---|---|---|
| 436,436 | Great Britain | Oct. 10, 1935 |
| 2,267 | Great Britain | 1875 |

Certificate of Correction

Patent No. 2,449,064.

September 14, 1948.

EMMET R. ENGEL

It is hereby certified that errors appear in the printed specification of the above numbered patent requiring correction as follows:

Column 2, line 47, for "olors" read *odors*; column 6, line 62, claim 2, for "trated" read *treated*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*